United States Patent
Peterson et al.

(10) Patent No.: US 12,546,230 B1
(45) Date of Patent: Feb. 10, 2026

(54) INTERNALLY COOLED BRUSH SEAL BACKING PLATE AND METHOD

(71) Applicant: RTX CORPORATION, Farmington, CT (US)

(72) Inventors: Christopher Peterson, Roanoke, IL (US); Howard J. Liles, Newington, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 19/215,056

(22) Filed: May 21, 2025

(51) Int. Cl.
  *F01D 11/24* (2006.01)
  *F01D 5/18* (2006.01)

(52) U.S. Cl.
  CPC .............. *F01D 11/24* (2013.01); *F01D 5/186* (2013.01); *F05D 2240/11* (2013.01); *F05D 2240/56* (2013.01); *F05D 2250/185* (2013.01); *F05D 2260/202* (2013.01); *F05D 2300/6033* (2013.01)

(58) Field of Classification Search
  CPC ....................................................... F01D 11/24
  See application file for complete search history.

(56) References Cited

U.S. PATENT DOCUMENTS

| 6,244,599 | B1 | 6/2001 | Braun et al. |
| 7,438,526 | B2 * | 10/2008 | Enderby ............... F16J 15/3288 |
| | | | 415/231 |
| 11,959,422 | B2 | 4/2024 | Karanian et al. |

FOREIGN PATENT DOCUMENTS

| CN | 116241664 A | * | 6/2023 | .............. F16J 15/16 |
| CN | 118564347 A | | 8/2024 | |

* cited by examiner

*Primary Examiner* — Sabbir Hasan
(74) *Attorney, Agent, or Firm* — Christopher B. Kilner; MILLEN, WHITE, ZELANO & BRANIGAN

(57) ABSTRACT

A cooled brush seal for use with a CMC component of a gas turbine engine having a hot side exposed to a hot gas path and an opposing side having a cavity for feeding a cooling flow to at least one film cooling hole. The cooled brush seal includes: an OD backing plate; an ID backing plate; a plurality of brush seal bristles sandwiched between the OD backing plate and the ID backing plate; a first hole extending through the OD backing plate, the brush seal bristles, and the ID backing plate; and a cover plate attached to an inner surface of the ID backing plate and including a second hole circumferentially offset from the first hole and forming a second passage into the cavity, wherein the ID backing plate and the cover plate form a circumferential cooling passage extending between the first hole and the second hole.

20 Claims, 5 Drawing Sheets

INTERNALLY COOLED BRUSH SEAL BACKING PLATE AND METHOD

FIELD OF THE INVENTION

The subject matter disclosed herein relates to brush seals as used between gas turbine components and, in particular, to a brush seal with an internally cooled backing plate for use when the brush seal provides cooling flow ingress to a cavity of a ceramic matrix composite (CMC) component.

BACKGROUND OF THE INVENTION

Gas turbine engines or jet engines, in general, include a fan section, a compressor section, a combustion section, and a turbine section. Air enters through the fan section and is compressed in the compressor section before being introduced into the combustion section. In the combustion section, the air is mixed with fuel and ignited to generate a high-energy, high temperature gas flow. The high-energy, high temperature gas flow is expanded in the turbine section which is used to create thrust and to drive the compressor and fan sections.

Certain components of gas turbine engines are thus exposed to the high-energy, high temperature gas flow (flow path components). Therefore, it is desirable that such components be made of heat-resistant materials such as ceramic matrix composites (CMCs). CMC components can withstand much higher operating temperatures than components composed of superalloys. However, CMC components have comparably lower thermal conductivity. To increase their operational lifespans, precautions can be taken to cool CMC gas path components by subjecting the components to a flow of cooling fluid (e.g., air).

For example, to protect against oxidation and recession, a CMC blade outer air seal (BOAS) or segments thereof (also known as a blade shroud or blade shroud segments) require cooling air to be delivered through internal film cooling holes to gas path surfaces. To provide cooling of such CMC gas path components, secondary air flows, i.e., secondary to the main flow of high-energy, high temperature gas, can be used to cool or protect components of the gas turbine engines that are exposed to high temperatures by providing film cooling via a thin layer of cool gas on surfaces directly exposed to the hot gas flow. To facilitate such cooling of the CMC gas path components, cavities can be provided within the components themselves to allow secondary cooling air to be supplied to appropriately-located film cooling holes. For example, a gas path component such as a CMC BOAS or segment thereof can be provided with an internal cooling cavity to allow cooling air to flow to a region of the BOAS to provide film cooling to reduce its thermal deterioration due to exposure to the hot gas path.

However, given the packaging constraints within a turbine engine, the sensitivity of CMC materials to machined features, and the manufacturing difficulties involved with providing cooling circuit components with non-machining techniques (e.g., casting-like processes and the like), feeding of the cooling flow to the internal cavity of the CMC BOAS may be difficult.

Recently, it has been proposed to provide a secondary air flow to an internal cavity of a CMC gas path component through an opening in a brush seal. See, for example, co-pending application Ser. No. 19/023,125 entitled "BRUSH SEAL WITH INTEGRAL COOLING CHANNEL AND METHOD" and Ser. No. 19/023,115 entitled "INTEGRAL BRUSH SEAL COVER PLATE AND METHOD."

However, because such brush seals use a metallic backing plate, certain issues may arise. High temperatures on the seal lands of a turbine's gas path components often drive significant conductive heat transfer into the metallic brush seal backing plates. Brush seals must be designed in such a way that the components can sustain such high temperatures. When contacting metallic gas path components, high Nickel (Ni) content based superalloys have given brush seals sufficient temperature capabilities to withstand operating temperatures. However, CMC gas path components can operate at significantly higher surface temperatures than metal gas path components.

The above information disclosed in this Background section is only for understanding of the background of the inventive concepts and, therefore, it may contain information that does not constitute prior art.

SUMMARY OF THE INVENTION

The present disclosure is directed, in a first aspect, to a cooled brush seal for use with a ceramic matrix composite (CMC) component of a gas turbine engine, the CMC component having a hot side configured for exposure to a hot gas path of the gas turbine engine and an opposing side having a seal land. The cooled brush seal includes: an outer diameter (OD) backing plate; an inner diameter (ID) backing plate; a plurality of brush seal bristles sandwiched between the OD backing plate and the ID backing plate; a first hole forming a first passage extending through the OD backing plate, the brush seal bristles, and the ID backing plate; and a cover plate attached to an inner surface of the ID backing plate and including a second hole circumferentially offset from the first hole and forming a second passage into the CMC component. The ID backing plate and the cover plate form a circumferentially-extending cooling passage extending between the first hole and the second hole.

In an embodiment, the cover plate may be welded or brazed to the ID backing plate to form the cooling passage.

In another embodiment, the cover plate may have a channel and the ID backing plate may be flat.

In a further embodiment, the cover plate may include a plurality of alternating axial walls to form a serpentine flow path through the cooling passage.

In yet another embodiment, the cover plate may be flat and the ID backing plate may have a channel.

In an embodiment, the ID backing plate may include a plurality of alternating axial walls to form a serpentine flow path through the cooling passage.

In another embodiment, the cover plate may include recesses dimensioned to receive edges of the ID backing plate.

In a further embodiment, the ID backing plate may include recesses dimensioned to receive edges of the cover plate.

In yet another embodiment, the cooled brush seal may be configured for use with a CMC component comprising CMC blade outer air seal (BOAS) formed of a plurality of segments having a cavity for feeding a cooling flow to at least one film cooling hole of the CMC BOAS and may include a cooling passage for each segment that feeds the cavity via the second hole.

The present disclosure is also directed, in a second aspect, to a cooled brush seal for use with a ceramic matrix composite (CMC) blade outer air seal (BOAS) of a gas turbine engine, the CMC BOAS formed of a plurality of segments having a hot side configured for exposure to a hot gas path of the gas turbine engine and an opposing side having a seal land and a cavity for feeding a cooling flow to at least one film cooling hole of the CMC BOAS. The brush seal includes: an outer diameter (OD) backing plate; an inner diameter (ID) backing plate; a plurality of brush seal bristles sandwiched between the OD backing plate and the ID backing plate; a first hole for each segment forming a first passage extending through the OD backing plate, the brush seal bristles, and the ID backing plate; and a cover plate welded or brazed to an inner surface of the ID backing plate and including a second hole for each segment circumferentially offset from the first hole and forming a second passage into the cavity of the segment. One of the ID backing plate and the cover plate includes a serpentine channel so as to form a circumferentially-extending serpentine cooling passage for each segment extending between the first hole and the second hole.

In an embodiment, the serpentine cooling passage may include a plurality of alternating axial walls.

In another embodiment, one of the ID backing plate or the cover plate, respectively, may include recesses dimensioned to receive edges of the cover plate or ID backing plate, respectively.

The present disclosure is further directed, in a third aspect, to a method of cooling a brush seal for use with ceramic matrix composite (CMC) component of a gas turbine engine, the CMC component having a hot side configured for exposure to a hot gas path of the gas turbine engine and an opposing side having a seal land and a cavity for feeding a cooling flow to at least one film cooling hole of the CMC component. The method Includes: joining an outer diameter (OD) backing plate, an inner diameter (ID) backing plate, and a plurality of brush seal bristles sandwiched between the OD backing plate and the ID backing plate; forming a first passage with a first hole extending through the OD backing plate, the brush seal bristles, and the ID backing plate; attaching a cover plate to an inner surface of the ID backing plate, the cover plate including a second hole circumferentially offset from the first hole and forming a second passage into the cavity of the CMC component, wherein the ID backing plate and the cover plate form a circumferentially-extending cooling passage extending between the first hole and the second hole; and feeding a cooling flow through the first hole into the cooling passage and through the second hole into the cavity to supply the at least one film cooling hole.

In an embodiment of the method, attaching the cover plate may include welding or brazing the cover plate to the ID backing plate.

In another embodiment of the method, the cooling passage may be formed from a channel in the cover plate.

In a further embodiment of the method, the cooling flow through the cooling passage may be serpentine based upon a plurality of alternating axial walls extending into the channel.

In yet another embodiment of the method, the cooling passage may be formed from a channel in the ID backing plate.

In an embodiment of the method, the cooling flow through the cooling passage may be serpentine based upon a plurality of alternating axial walls extending into the channel.

In another embodiment of the method, the brush seal may be provided on a CMC component comprising a CMC BOAS.

In a further embodiment of the method, the CMC BOAS may be segmented into a plurality of CMC BOAS segments, and one of the cooling passages with the first hole and the second hole may be provided for each CMC BOAS segment.

BRIEF DESCRIPTION OF FIGURES

The features of the disclosure believed to be novel and the elements characteristic of the invention are set forth with particularity in the appended claims. The figures are for illustration purposes only and are not drawn to scale. The disclosure itself, however, both as to organization and method of operation, can best be understood by reference to the description of the preferred embodiment(s) which follows, taken in conjunction with the accompanying drawings in which:

DETAILED DESCRIPTION OF THE INVENTION

Figure 1:
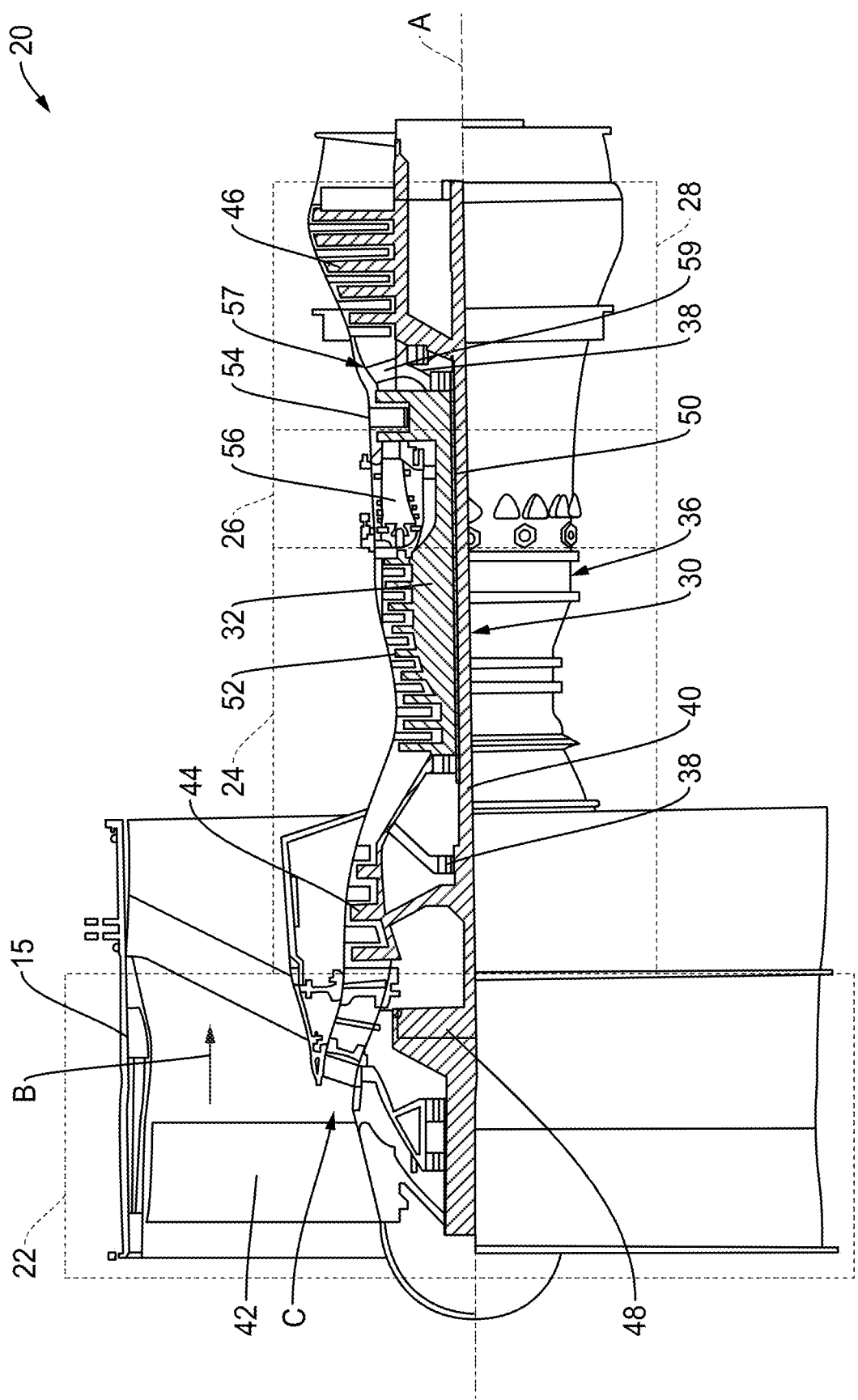
FIG. 1 schematically illustrates a partial cross section of an exemplary gas turbine engine.

The embodiments of the present disclosure can comprise, consist of, and consist essentially of the features and/or steps described herein, as well as any of the additional or optional ingredients, components, steps, or limitations described herein or would otherwise be appreciated by one of skill in the art.

The following discussion omits or only briefly describes conventional features of the disclosed technology that are apparent to those skilled in the art. Reference to a particular embodiment does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations. A person of ordinary skill in the art would know how to use the instant invention, in combination with routine experiments, to achieve other outcomes not specifically disclosed in the examples or the embodiments.

Unless otherwise specifically defined herein, all terms are to be given their broadest possible interpretation including meanings implied from the specification as well as meanings understood by those skilled in the art and/or as defined in dictionaries, treatises, etc. Unless defined otherwise, all technical and scientific terms used herein have the same meaning as commonly understood by one of ordinary skill in the art in the field of the disclosed technology. It must also be noted that, as used in the specification and the appended claims, the singular forms "a," "an," and "the" include plural referents unless otherwise specified, and that the terms "includes" and/or "including," when used in this specification, specify the presence of stated features, elements, and/or components, but do not preclude the presence or addition of one or more other features, steps, operations, elements, components, and/or groups thereof. Additionally, methods, equipment, and materials similar or equivalent to those described herein can also be used in the practice or testing of the disclosed technology.

The devices of the present disclosure may be understood more readily by reference to the following detailed description of the embodiments taken in connection with the accompanying drawing figures, which form a part of this disclosure. It is to be understood that this application is not limited to the specific devices, methods, conditions or parameters described and/or shown herein, and that the terminology used herein is for the purpose of describing particular embodiments by way of example only and is not intended to be limiting. All spatial references, such as, for example, proximal, distal, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior."

It will further be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

Various examples of the disclosed technology are provided throughout this disclosure. The use of these examples is illustrative only, and in no way limits the scope and meaning of the invention or of any exemplified form. Likewise, the invention is not limited to any particular preferred embodiment(s) described herein. Indeed, modifications and variations of the invention may be apparent to those skilled in the art upon reading this specification, and can be made without departing from its spirit and scope. The invention is therefore to be limited only by the terms of the claims, along with the full scope of equivalents to which the claims are entitled.

Co-pending application Ser. No. 19/023,125 entitled "BRUSH SEAL WITH INTEGRAL COOLING CHANNEL AND METHOD," discloses a brush seal with an integral cooling channel that permits ingress of a cooling flow to a cavity in a CMC component such as a blade outer air seal (BOAS).

To protect against oxidation and recession, CMC components such as a CMC BOAS require cooling air to be delivered through internal film cooling holes to gas path surfaces to provide film cooling. Cooling air may be supplied to these gas path film cooling holes via brush seal thru-holes. However, since CMC gas path components can operate at significantly higher surface temperatures than metal components, it may be desirable to cool metallic brush seal backing plates so that these seals can contact the increased seal land temperatures of CMC gas path components.

The present disclosure is directed to providing and utilizing internal cooling passages within a metallic brush seal backing plate to reduce surface temperatures of the brush seal. Cooling flow enters the brush seal via thru-holes that extend through the brush seal's outer diameter (OD) backing plate, the bristle pack of the seal, and the inner diameter (ID) backing plate. Cooling flow then passes through internal serpentine passages machined into the ID backing plate or an associated ID cover plate, travelling circumferentially around the ID backing plate until egressing through thru-holes in the ID cover plate. The ID cover plate may be welded or brazed to the brush seal's ID backing plate to create the described channel for cooling air to travel through.

Accordingly, embodiments in accordance with the present disclosure may reduce a temperature of the brush seal ID backing plate metal by providing flow paths of cooling air to actively cool the ID backing plate to permit hotter brush seal and seal land operating temperatures. While generally disclosed with respect to feeding a cavity in a CMC component, the present disclosure may also be used to cool non-gas path CMC seal lands if an outer diameter (OD) of a CMC component is too thin to have a cavity, impingement plate, or other heat-reducing feature.

While the illustrated example and discussion below often refers to a CMC BOAS, it should be recognized that the present disclosure is not limited to a CMC BOAS but includes any CMC component for which a cooling flow cavity is used for supplying film cooling, for example, combustion liners, turbine blades, and vanes.

In the discussion below, axial refers to a direction that coincides with the longitudinal axis of the engine. Radial refers to a direction that is radial with respect to the longitudinal axis of the engine. Circumferential refers to a direction that corresponds to the circumference of a circle around the longitudinal axis of the engine. The leading edge/portion of a structure is the edge/portion that faces into the flow of the hot gases, i.e., faces upstream. The trailing edge/portion of a structure is the edge/portion that the faces away from the flow of the hot gases, i.e., faces downstream.

FIG. 1 schematically illustrates an example of a gas turbine engine 20 (i.e., a two-spool turbofan) which includes a fan section 22, a compressor section 24, a combustor section 26, and a turbine section 28. Fan section 22 drives air along a bypass flow path B in a bypass duct defined within a housing 15, and also along a core flow path C for compression in compressor section 24, with subsequent introduction into combustor section 26, followed by expansion through turbine section 28. Although FIG. 1 depicts a two-spool turbofan gas turbine engine, it should be understood that the concepts described herein are not limited to use with two-spool turbofans engines and may be applied to other types of turbine engines.

Engine 20 generally includes a low speed spool 30 and a high-speed spool 32 mounted for rotation about an engine central longitudinal axis A, relative to an engine static structure 36, via several bearing systems 38. Various bearing systems 38 at various locations may alternatively or additionally be provided. The location of bearing systems 38 may be varied as appropriate to the application.

The low speed spool 30 generally includes an inner shaft 40 that interconnects, a first (or low) pressure compressor 44 and a first (or low) pressure turbine 46. Inner shaft 40 is connected to fan 42 through a speed change mechanism, which in this exemplary embodiment is illustrated as a geared structure 48 to drive fan 42 at a lower speed than the low speed spool 30. High speed spool 32 includes an outer shaft 50 that interconnects a second (or high) pressure compressor 52 and a second (or high) pressure turbine 54. Combustor 56 is positioned between high pressure compressor 52 and high-pressure turbine 54. A mid-turbine frame 57 of the engine static structure 36 may be arranged generally between the high-pressure turbine 54 and the low-pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core air flow is first compressed by low pressure compressor 44, and then by the high-pressure compressor 52. Thereafter, the core air flow is mixed and burned with fuel in combustor 56, then expanded in high pressure turbine 54 and low-pressure turbine 46. The mid-turbine frame 57 includes airfoils 59 which are in the core airflow path C. The turbines 46 and 54 rotationally drive the respective low speed spool 30 and high-speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low-pressure compressor, or aft of the combustor section 26 or even aft of turbine section 28, and fan 42 may be positioned forward or aft of the location of gear system 48.

The turbine section 28 includes at least one rotor and at least one blade extending radially outwardly from the rotor. The turbine section 28 may further include a blade outer air seal(s) (BOAS(s)). The blade outer air seal can be an assembly of a plurality of BOAS segments that together form an annular shaped shroud around the engine's central longitudinal axis A which is positioned between an outer casing of the engine and the turbine blade(s) of the turbine section.

Figure 2:
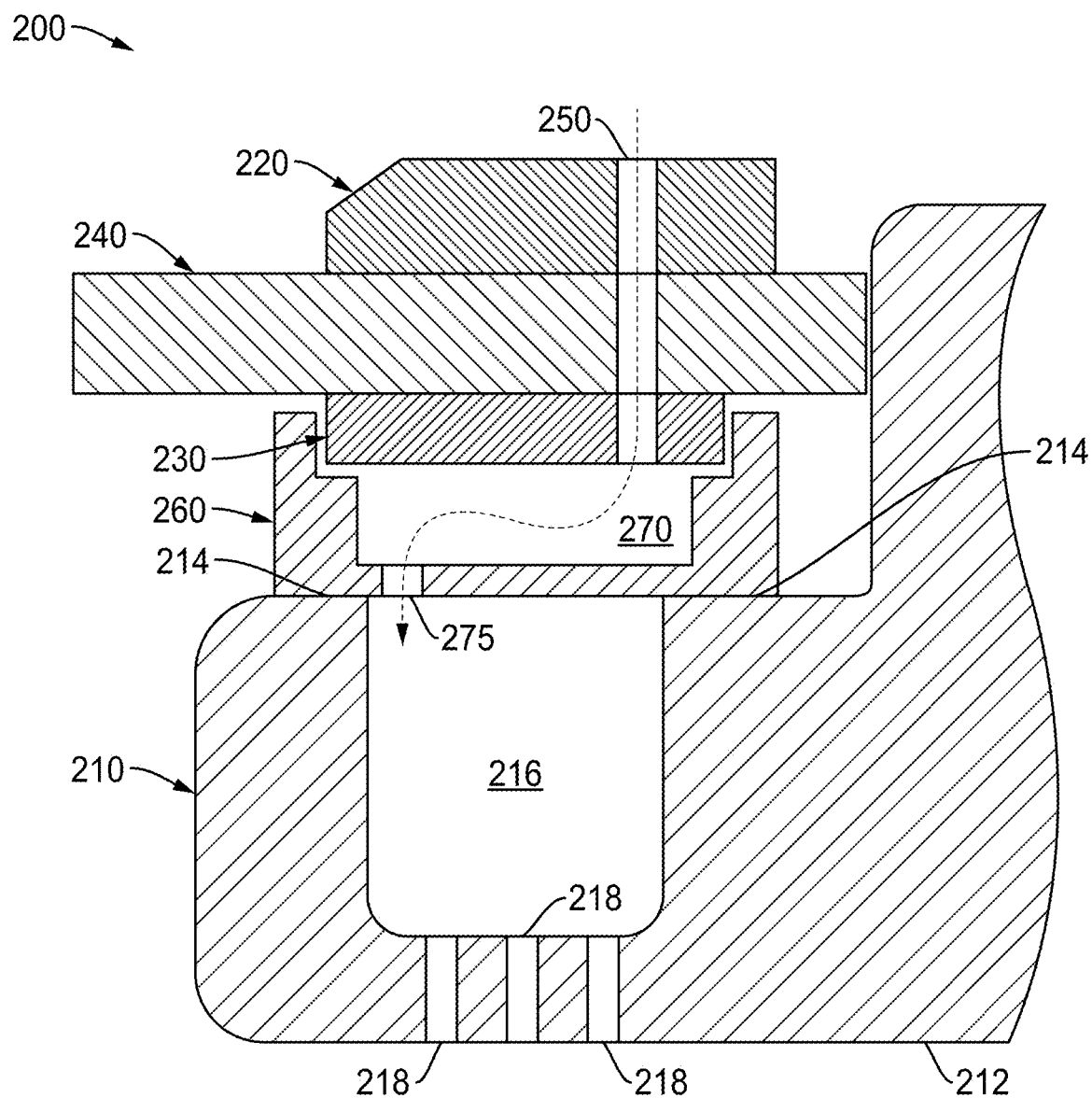
FIG. 2 schematically illustrates a partial cross section of an example embodiment of a cooled brush seal backing plate in accordance with the present disclosure.

With reference to FIG. 2, an embodiment of a cooled brush seal 200 in accordance with the present disclosure is used with a CMC component 210 of a gas turbine engine, which in this example may be a CMC BOAS. The CMC component 210 has a hot side 212 configured for exposure to a hot gas path of the gas turbine engine and an opposing side with a seal land 214 that has a cavity 216 formed therein for feeding a cooling flow to at least one film cooling hole 218 of the CMC component 210.

The cavity 216 may have an open top that is covered by a backing plate 260 of cooled seal 200, and cavity 216 may be formed within CMC component 210 in any suitable manner, including but not limited to being initially formed in a preform or a partially-densified preform for inclusion in the densified CMC component 210, or being formed by machining and/or grinding of a densified CMC component 210.

The cooled brush seal 200 will typically include an outer diameter (OD) backing plate 220, an inner diameter (ID) backing plate 230, a plurality of brush seal bristles 240 sandwiched between the OD backing plate 220 and the ID backing plate 230, and a backing plate 260 that forms a cooling channel 270. The OD backing plate 220, ID backing plate 230, brush seal bristles 240, and backing plate 260 may be made of a suitable metal alloy such as high-temperature, high Ni content and high Co content alloys. When high Ni content alloys are used, a coating may be provided on contacting portions of the ID backing plate 230 or CMC component 210 for compatibility reasons. The cooled brush seal 200 will typically be formed as a split ring and may encompass multiple segments of CMC components 210, acting as an interstage seal.

The cooled brush seal 200 includes a first hole 250 forming a passage extending through the OD backing plate 220, the brush seal bristles 240, and the ID backing plate 230. Although illustrated as a single passage for ease of illustration, multiple passages may also be formed without departing from the scope of the present disclosure. Additionally, when cooled brush seal 200 encompasses multiple segments of CMC components 210, one or more first holes 250 may be provided for each segment. The first hole(s) 250 may have circular or non-circular (polygonal, elliptical, irregular, etc.) cross-section, may be straight or not (i.e., curved, segmented, etc.), and/or may vary in cross-section (e.g., expanding, contracting, or combinations thereof). When a plurality of first holes 250 are included, the first holes 250 may be the same size or may be of different sizes, the first holes 250 may be parallel or non-parallel, and/or the first holes 250 may be regularly patterned or not (e.g., irregularly patterned or a combination patterns).

The cooled brush seal 200 also has a backing plate 260 that is attached to an inner surface of the ID backing plate 230 and configured to form a circumferentially-extending cooling passage 270 that leads to a second hole 275. While illustrated in the cross sectional view of FIG. 2, the second hole 275 will be spaced circumferentially from the first hole 250. In the embodiment illustrated in FIG. 2, the cover plate 260 includes a channel and recesses at the top of the channel to mate with the ID backing plate 230. An inner diameter of the cover plate 260 may be flat to form a seal land 214 with the CMC component 210. As used herein, "flat" refers only to the axial shape (i.e., flat in cross section) since the cover plate 260 is curved circumferentially into a split-ring shape. Because the cooling flow passes through the cooling passage 270, the temperature at the seal land 214 may be decreased.

In one or more embodiments, the cover plate 260 may be welded or brazed to the ID backing plate 230 and the recesses in the cover plate 260 may provide an increased surface for welding or brazing the ID backing plate 230. As with other portions of the cooled brush seal 200, the cover plate 260 may be made of a suitable metal alloy such as high Ni content alloys or high Co content alloys, and when high Ni content alloys are used, a coating may be provided on contacting portions of the ID backing plate 230 or CMC component 210 for compatibility reasons.

In order to provide film cooling air to film cooling holes 218 of the CMC component 210, the cover plate 260 includes the second hole 275 to feed cooling flow to cavity 216 which feeds the plurality of film cooling holes 218 in the CMC component 210.

Figure 3:
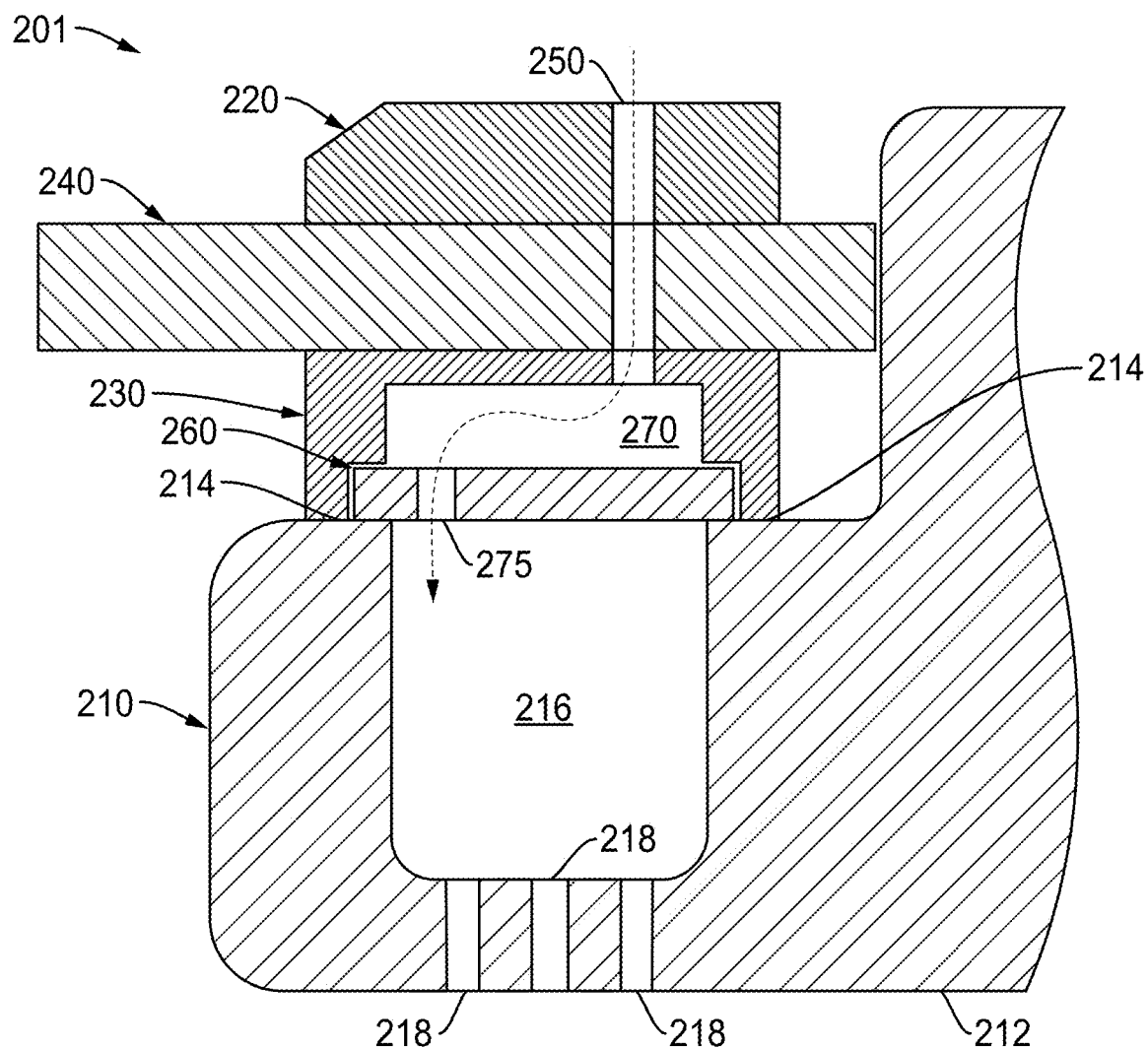
FIG. 3 schematically illustrates a partial cross section of another example embodiment of a cooled brush seal backing plate in accordance with the present disclosure.

With reference to FIG. 3, another embodiment of a cooled brush seal 201 in accordance with the present disclosure is used with a CMC component 210 of a gas turbine engine, which in this example may be a CMC BOAS. This embodiment is substantially similar to the embodiment of FIG. 2, except that in this embodiment, the channel forming cooling passage 270 is disposed in the ID backing plate 230, and the cover plate 260 may be flat and have edges disposed in recesses formed on an inner side of the ID backing plate 230.

Figure 4A:
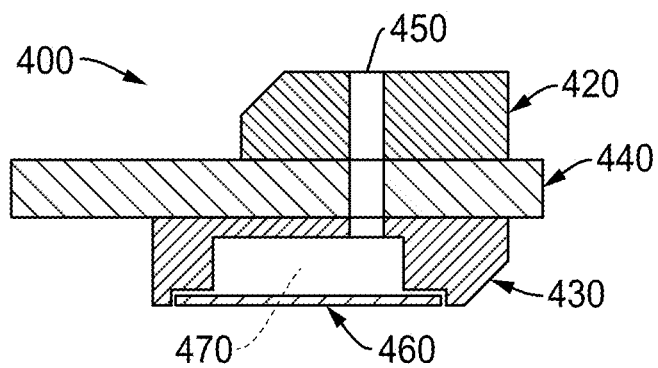
FIG. 4A schematically illustrates a cross section of a further example embodiment of a cooled brush seal backing plate in accordance with the present disclosure.
Figure 4B:
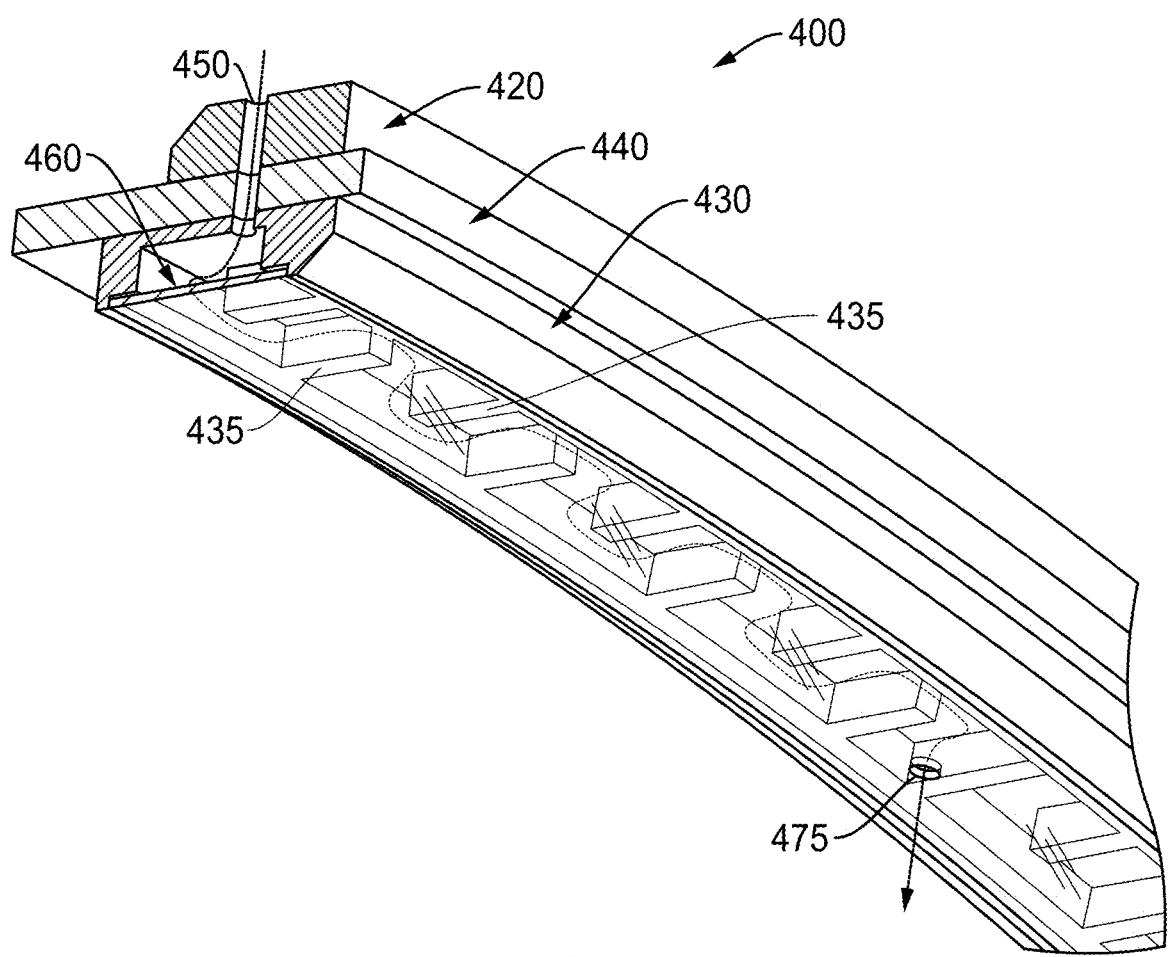
FIG. 4B schematically illustrates a partial perspective view of the further example embodiment of the cooled brush seal backing plate of FIG. 4A in accordance with the present disclosure.
Figure 4C:
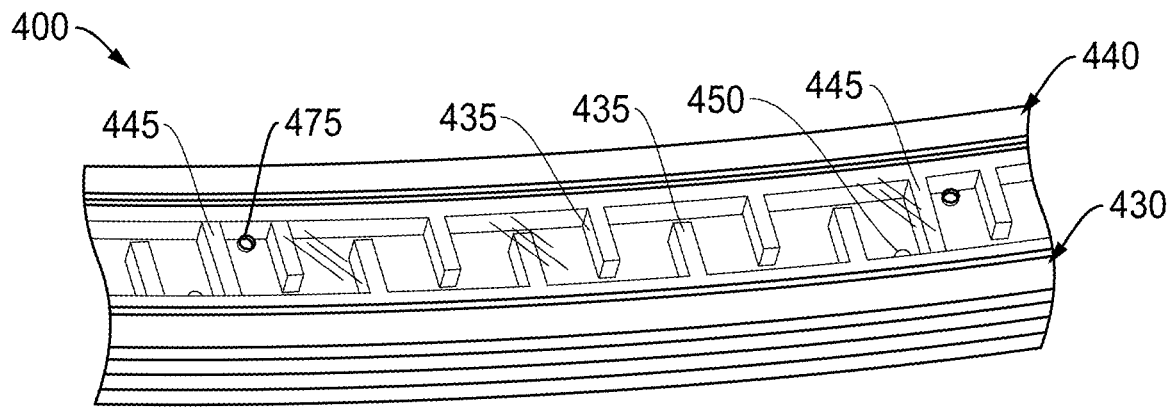
FIG. 4C schematically illustrates another partial perspective view of the further example embodiment of the cooled brush seal backing plate of FIGS. 4A and 4B in accordance with the present disclosure.

With reference to FIGS. 4A, 4B, and 4C, a further embodiment of a cooled brush seal 400 in accordance with the present disclosure illustrated. For clarity, in FIGS. 4B and 4C, the cover plate 460 is shown as transparent in order to view the inside of the cooling passage 470.

The cooled brush seal 400 includes an OD backing plate 420, an ID backing plate 430, a plurality of brush seal bristles 440 sandwiched between the OD backing plate 420 and the ID backing plate 430, a first hole 450 forming a first passage extending through the OD backing plate 420, the brush seal bristles 440, and the ID backing plate 430, and a cover plate 460 attached to an inner surface of the ID backing plate 430 and including a second hole 475 circumferentially offset from the first hole. The ID backing plate 430 and the cover plate 460 form a circumferentially-extending cooling passage 470 extending between the first hole 450 and the second hole 475.

As shown most clearly in FIG. 4A, the cover plate 460 is flat and the ID backing 430 plate has a channel formed therein. As used herein, "flat" refers only to the axial shape (i.e., flat in cross section) since the cover plate 460 is curved circumferentially into a split-ring shape.

As shown most clearly in FIGS. 4B and 4C, the ID backing plate 430 includes a plurality of alternating axial walls 435 to form a serpentine flow path (shown by dotted arrow in FIG. 4B) through the cooling passage 470. As shown in FIG. 4C, sections with a cooling passage between hole 450 and hole 475 may be formed by walls 445 that extend fully across the channel in ID backing plate 430, with walls 435 alternately extending partially from either side of the channel to form the serpentine flow path. In this manner, separate cooling passages 470 may be formed for each CMC component segment. For example, when the cooled brush seal 400 is configured for use with a CMC component comprising CMC BOAS formed of a plurality of segments, the cooled brush seal 400 can include a cooling passage 470 for each segment.

Figure 5:
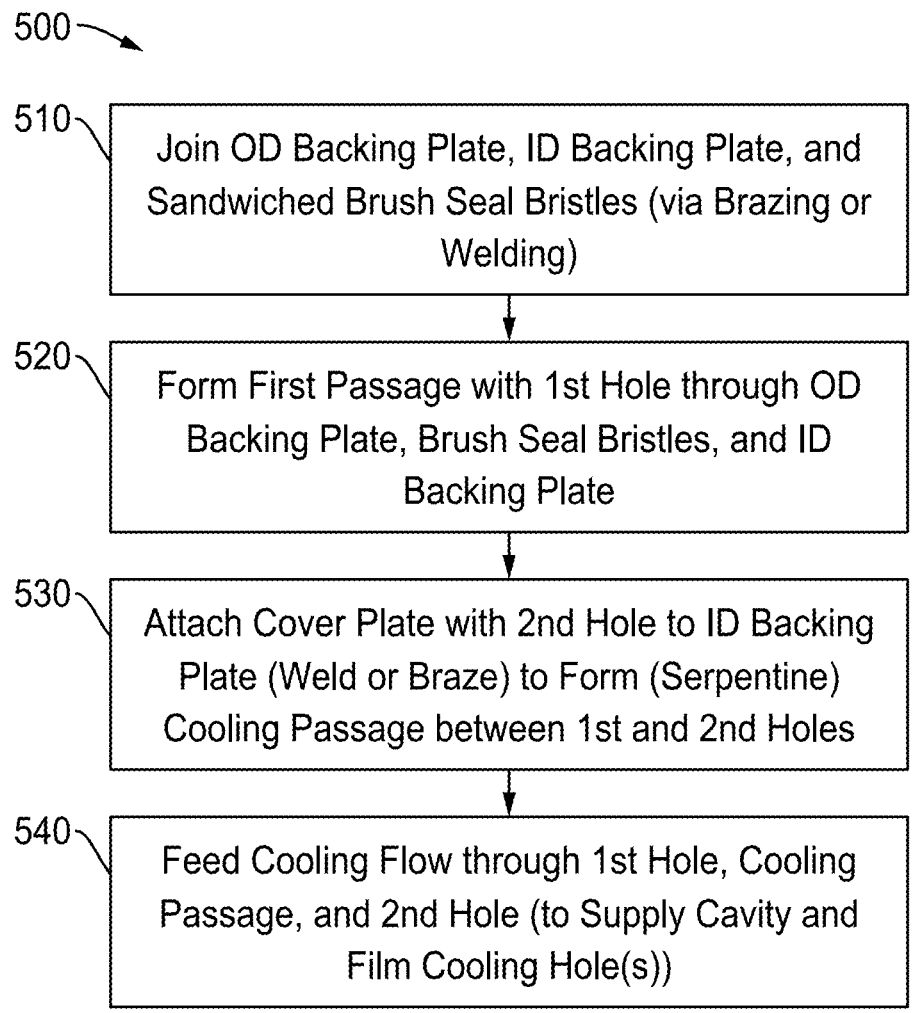
FIG. 5 is a flow diagram of an example process in accordance with the present disclosure.

Referring to FIG. 5, in another embodiment of the present disclosure, the cover plate 260 may be utilized in a method 500 of method of cooling a brush seal for use with CMC component of a gas turbine engine, wherein the CMC component has a hot side configured for exposure to a hot gas path of the gas turbine engine and an opposing side having a seal land and a cavity for feeding a cooling flow to at least one film cooling hole of the CMC component.

The method includes a step 510 of joining an outer diameter (OD) backing plate, an inner diameter (ID) backing plate, and a plurality of brush seal bristles sandwiched between the OD backing plate and the ID backing plate. In one or more embodiments, a brazing or welding technique may be used in a known manner to join the elements.

In a next step 520, a first passage is formed via a first hole extending through the OD backing plate, the brush seal bristles, and the ID backing plate. The first hole allows a flow of cooling air (i.e., a cooling flow) to pass through the basic elements of the brush seal.

In a step 530, a cover plate is attached to an inner surface of the ID backing plate. The cover plate includes a second hole circumferentially offset from the first hole and forms a second passage into the cavity of the CMC component, wherein the ID backing plate and the cover plate form a circumferentially-extending cooling passage extending between the first hole and the second hole. In one or more embodiments, the cover plate may be attached by welding or brazing the cover plate to the ID backing plate.

Method 500 is completed in step 540, which involves feeding a cooling flow through the first hole into the cooling passage and through the second hole into the cavity to supply the at least one film cooling hole.

In various embodiments of method 500, the cooling passage may be formed from a channel in the cover plate or a channel in the ID backing plate. In additional embodiments, the cooling flow through the cooling passage may be serpentine based upon a plurality of alternating axial walls extending into the channel. In various embodiments, the cooling flow through the cooling passage may be in a serpentine path based upon a plurality of alternating axial walls extending into the channel formed in either the ID backing plate or the cover plate.

In one or more embodiments of method 500, the brush seal may be provided on a CMC component comprising a CMC BOAS. In various embodiments, the CMC BOAS may be segmented into a plurality of CMC BOAS segments, and one of the cooling passages with the first hole and the second hole may be provided for each CMC BOAS segment.

Embodiments of the present disclosure may enhance the durability and structural capabilities of metallic brush seals by providing convective cooling passages within said brush seals to lower part temperatures. By reducing brush seal backing plate temperatures, embodiments of the present disclosure allow for metallic parts to touch CMC components (with hotter surface temperatures) that would otherwise exceed the temperature limits of uncooled brush seals. Embodiments in accordance with the present disclosure may also be used to cool non-gas path CMC seal lands if a CMC OD static part is too thin to have a machined cooling pocket cavity, impingement plate, or other heat-reducing feature.

While the present disclosure has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present disclosure.

What is claimed is:

1. A cooled brush seal for use with a ceramic matrix composite (CMC) component of a gas turbine engine, the CMC component having a hot side configured for exposure to a hot gas path of the gas turbine engine and an opposing side having a seal land, the cooled brush seal comprising:
    an outer diameter (OD) backing plate;
    an inner diameter (ID) backing plate;
    a plurality of brush seal bristles sandwiched between the OD backing plate and the ID backing plate;
    a first hole forming a first passage extending through the OD backing plate, the brush seal bristles, and the ID backing plate; and
    a cover plate attached to an inner surface of the ID backing plate and including a second hole circumferentially offset from the first hole and forming a second passage into the CMC component,
    wherein the ID backing plate and the cover plate form a circumferentially-extending cooling passage extending between the first hole and the second hole.

2. The brush seal of claim 1, wherein the cover plate is welded or brazed to the ID backing plate to form the cooling passage.

3. The brush seal of claim 2, wherein the cover plate has a channel and the ID backing plate is flat.

4. The brush seal of claim 3, wherein the cover plate includes a plurality of alternating axial walls to form a serpentine flow path through the cooling passage.

5. The brush seal of claim 2, wherein the cover plate is flat and the ID backing plate has a channel.

6. The brush seal of claim 3, wherein the ID backing plate includes a plurality of alternating axial walls to form a serpentine flow path through the cooling passage.

7. The brush seal of claim 3, wherein the cover plate includes recesses dimensioned to receive edges of the ID backing plate.

8. The brush seal of claim 5, wherein the ID backing plate includes recesses dimensioned to receive edges of the cover plate.

9. The brush seal of claim 1, wherein the cooled brush seal is configured for use with a CMC component comprising CMC blade outer air seal (BOAS) formed of a plurality of segments having a cavity for feeding a cooling flow to at least one film cooling hole of the CMC BOAS and includes a cooling passage for each segment that feeds the cavity via the second hole.

10. A cooled brush seal for use with a ceramic matrix composite (CMC) blade outer air seal (BOAS) of a gas turbine engine, the CMC BOAS formed of a plurality of segments having a hot side configured for exposure to a hot gas path of the gas turbine engine and an opposing side having a seal land and a cavity for feeding a cooling flow to at least one film cooling hole of the CMC BOAS, the cooled brush seal comprising:
- an outer diameter (OD) backing plate;
- an inner diameter (ID) backing plate;
- a plurality of brush seal bristles sandwiched between the OD backing plate and the ID backing plate;
- a first hole for each segment forming a first passage extending through the OD backing plate, the brush seal bristles, and the ID backing plate; and
- a cover plate attached by being welded or brazed to an inner surface of the ID backing plate and including a second hole for each segment circumferentially offset from the first hole and forming a second passage into the cavity of the segment,
- wherein one of the ID backing plate and the cover plate includes a serpentine channel such that the ID backing plate and the cover plate form a circumferentially-extending serpentine cooling passage for each segment extending between the first hole and the second hole.

11. The brush seal of claim 10, wherein the serpentine cooling passage includes a plurality of alternating axial walls.

12. The brush seal of claim 10, wherein one of the ID backing plate or the cover plate, respectively, includes recesses dimensioned to receive edges of the cover plate or ID backing plate, respectively.

13. A method of cooling a brush seal for use with ceramic matrix composite (CMC) component of a gas turbine engine, the CMC component having a hot side configured for exposure to a hot gas path of the gas turbine engine and an opposing side having a seal land and a cavity for feeding a cooling flow to at least one film cooling hole of the CMC component, the method comprising:
- joining an outer diameter (OD) backing plate, an inner diameter (ID) backing plate, and a plurality of brush seal bristles sandwiched between the OD backing plate and the ID backing plate;
- forming a first passage with a first hole extending through the OD backing plate, the brush seal bristles, and the ID backing plate;
- attaching a cover plate to an inner surface of the ID backing plate, the cover plate including a second hole circumferentially offset from the first hole and forming a second passage into the cavity of the CMC component, wherein the ID backing plate and the cover plate form a circumferentially-extending cooling passage segment extending between the first hole and the second hole; and
- feeding a cooling flow through the first hole into the cooling passage segment and through the second hole into the cavity to supply the at least one film cooling hole.

14. The method of claim 13, wherein attaching the cover plate comprises welding or brazing the cover plate to the ID backing plate.

15. The method of claim 13, wherein the cooling passage segment is formed from a channel in the cover plate.

16. The method of claim 15, wherein the cooling flow through the cooling passage segment is serpentine based upon a plurality of alternating axial walls extending into the channel.

17. The method of claim 13, wherein the cooling passage segment is formed from a channel in the ID backing plate.

18. The method of claim 17, wherein the cooling flow through the cooling passage segment is serpentine based upon a plurality of alternating axial walls extending into the channel.

19. The method of claim 13, wherein the brush seal is provided on a CMC component comprising a CMC BOAS.

20. The method of claim 19, wherein the CMC BOAS is segmented into a plurality of CMC BOAS segments, and the cooling passage segment with the first hole and the second hole is provided for each CMC BOAS segment.

\* \* \* \* \*